T. A. EDISON.
BEARING.
APPLICATION FILED MAR. 23, 1908.
1,013,869.
Patented Jan. 9, 1912.
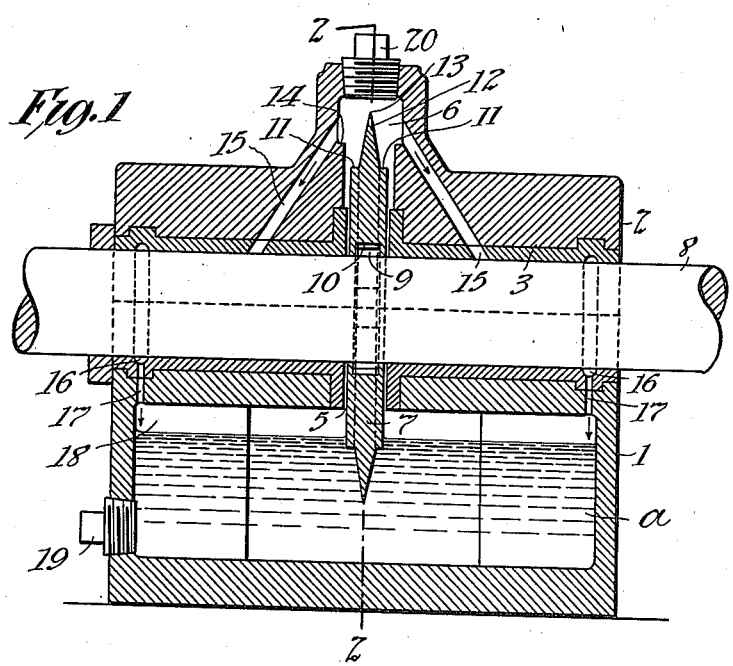
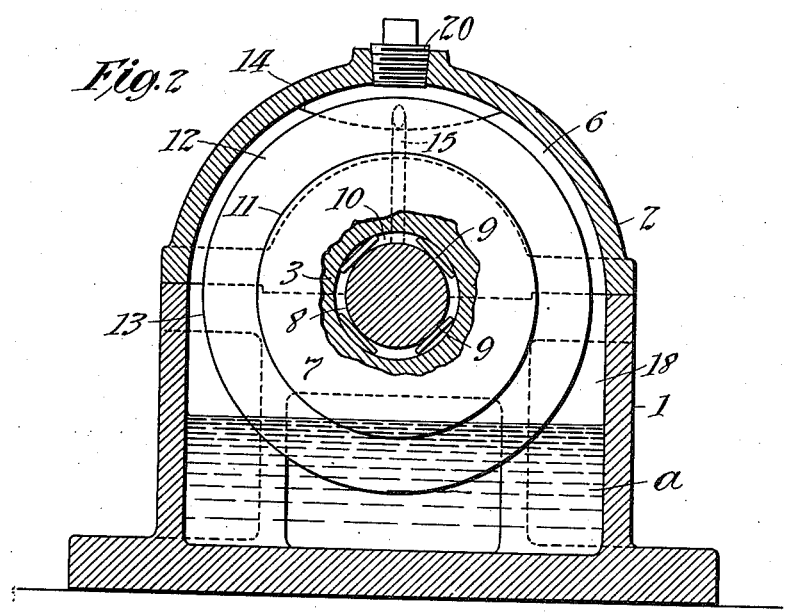
Witnesses:
Frank D. Lewis
Herbert H. Dyke
Inventor:
Thomas A. Edison
by Frank L. Dyer
Atty.

UNITED STATES PATENT OFFICE.

THOMAS A. EDISON, OF LLEWELLYN PARK, ORANGE, NEW JERSEY.

BEARING.

1,013,869.
Specification of Letters Patent. Patented Jan. 9, 1912.
Application filed March 23, 1908. Serial No. 422,652.

*To all whom it may concern:*

Be it known that I, THOMAS A. EDISON, a citizen of the United States, and a resident of Llewellyn Park, Orange, county of Essex, and State of New Jersey, have invented certain new and useful Improvements in Bearings, of which the following is a description.

My invention relates to bearings for the supporting of shafts driven at high speed. As is well-known, such shafts require very thorough lubrication in order to reduce friction to a minimum, thereby avoiding overheating. In the bearing which forms the subject matter of this application, there is an oil reservoir, and improved means applied to the shaft for removing oil from the reservoir and applying it in a continuous stream to the shaft, and means are also preferably provided for causing the oil to return to the reservoir so that there is a continuous circulation of the same.

Reference is hereby made to the accompanying drawing, in which—

Figure 1 is a verticle longitudinal section of a bearing constructed in accordance with my invention, and Fig. 2 is a section on line 2—2 of Fig. 1.

The bearing shown comprises a supporting casing formed of upper and lower pillow blocks 1 and 2, secured together in any suitable manner, and provided on their inner surface or bore with a lining or sleeve 3, of Babbitt metal, or other suitable material. The pillow blocks 1 and 2 are formed with vertical recesses 5 and 6 respectively, and within the same is a ring 7, which is frictionally mounted upon the shaft 8 by means of a plurality of flat spring plates 9, said plates occupying an internal groove 10 formed within the ring 7. The periphery of the ring 7 is formed with shoulders 11, and sloping surfaces 12, which meet at a sharp edge 13. Within the recess 6 of the upper pillow block are a pair of lateral shoulders 14, and at the angles formed at the bases of said shoulders are a pair of channels 15 sloping downward to the bore of the bearing. Near the ends of the lining 3 are circular channels 16, the bottoms of which communicate with vertical channels 17, which lead to the oil reservoir 18, formed in the lower pillow block. Threaded plugs 19 and 20 may be provided for admitting and drawing off oil and for cleaning out the bearing.

The ring 7 is driven by the shaft 8 at a high speed, substantially the same as that of the shaft; the lower portion of the ring dips into the oil $a$, contained within the reservoir 18 and is coated with the same, and the oil is thrown off by centrifugal action, which is greatly aided by the form of the sloping surfaces 12 and edge 13. The oil is distributed in a shower upon the interior of the recess 6, collecting on the shoulders 14, whence it flows down the channels 15 onto the upper surface of the shaft 8, and along and around the same, returning to the reservoir 18 through the channels 17 and recess 5. I have found this bearing to operate successfully without overheating over long periods of time, with shafts driven at a speed as high as three thousand revolutions per minute.

Having now described my invention, what I claim is:—

1. The combination of a shaft, a casing within which said shaft is journaled, a ring and spring plates for frictionally securing said ring to said shaft, said ring being formed with continuous lateral surfaces 12 converging to a sharp edge and with shoulders 11, and an oil well into which said ring dips, substantially as set forth.

2. In a device of the class described, the combination of the shaft 8, ring 7 having an annular internal groove 10, and spring plates 9 within said groove for frictionally securing said ring to said shaft, substantially as set forth.

This specification signed and witnessed this 13th day of March 1908.

THOS. A. EDISON.

Witnesses:
FRANK L. DYER,
ANNA R. KLEHM.